April 15, 1930.    C. W. KERR    1,755,120
STONE DISTRIBUTOR
Filed April 16, 1928    3 Sheets-Sheet 3
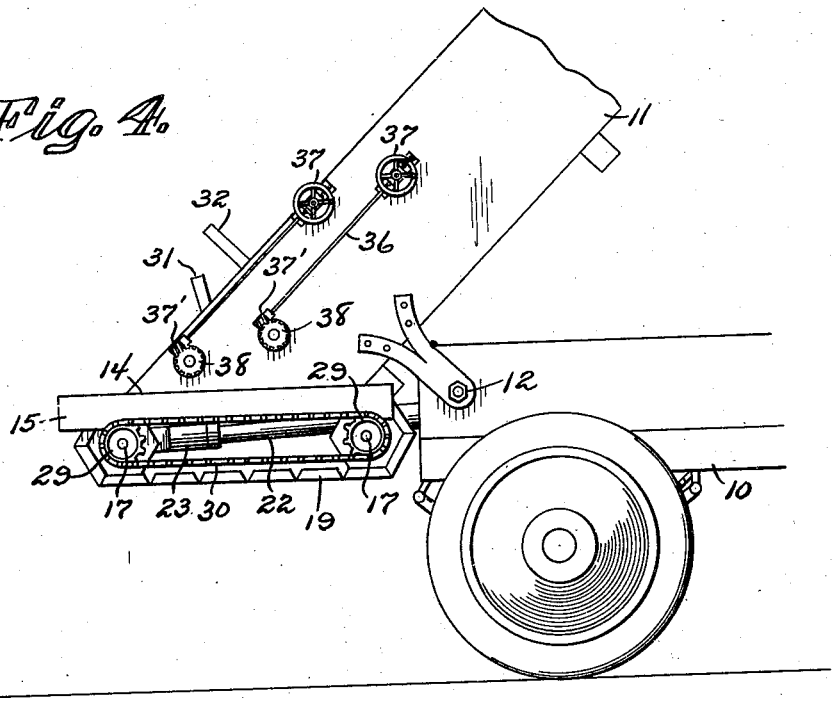
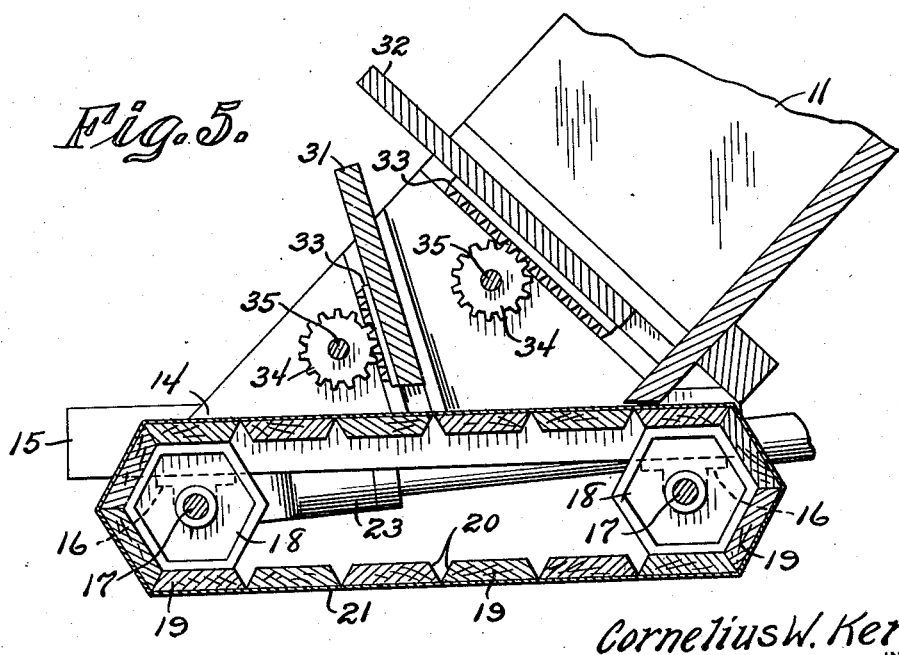
Cornelius W. Kerr
INVENTOR
BY Victor J. Evans
ATTORNEY
WITNESS:

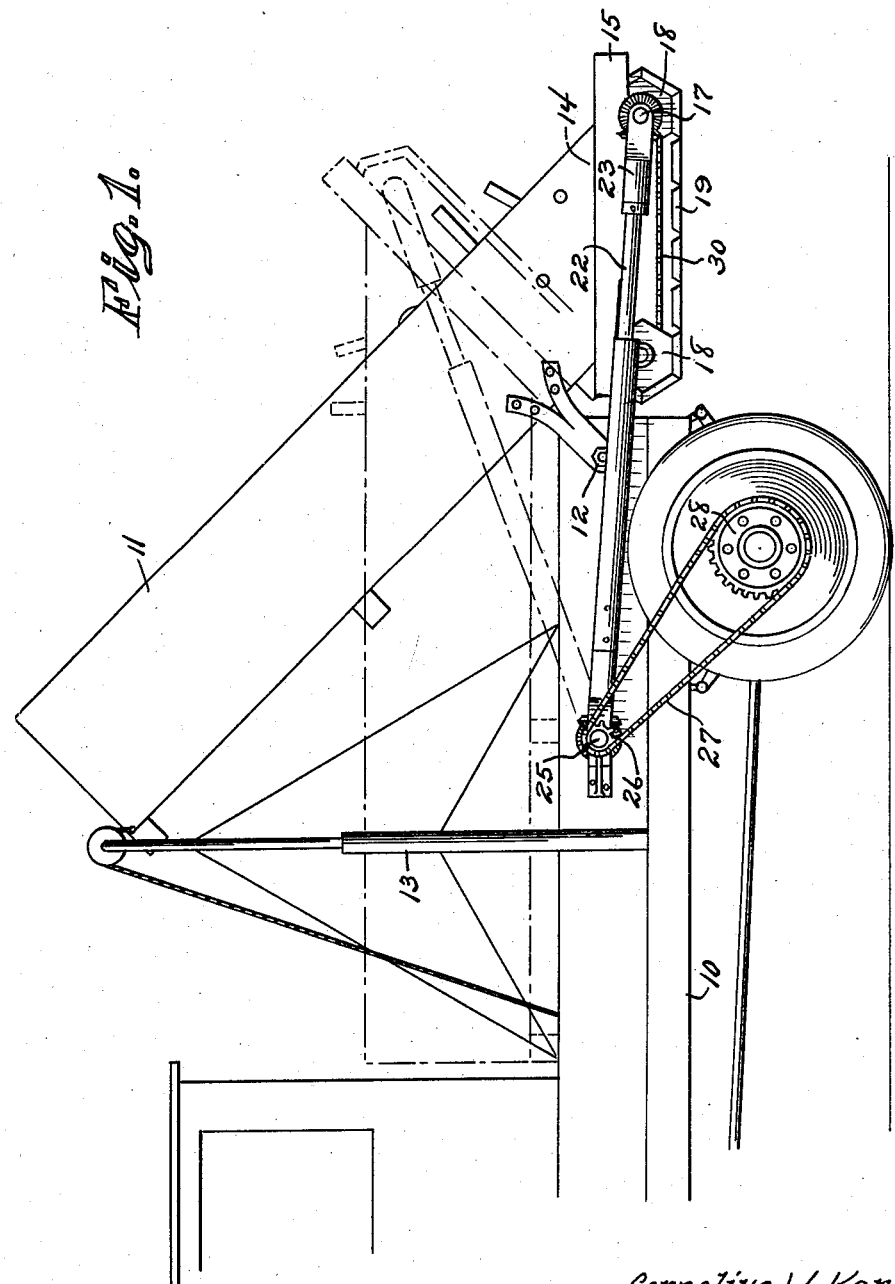

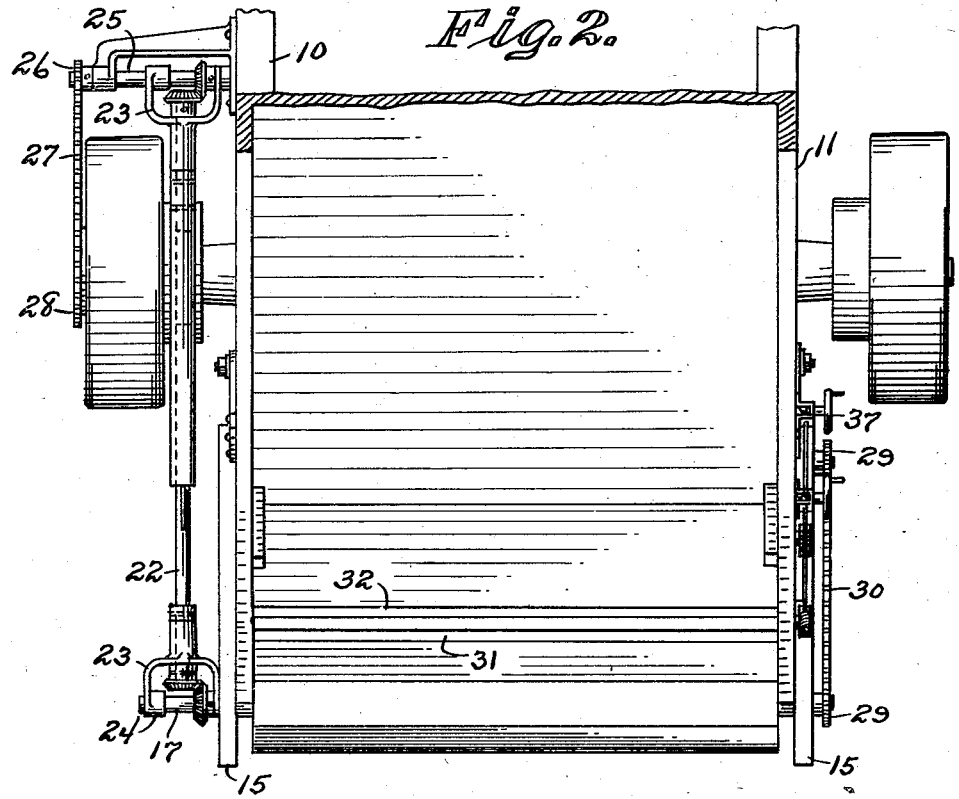
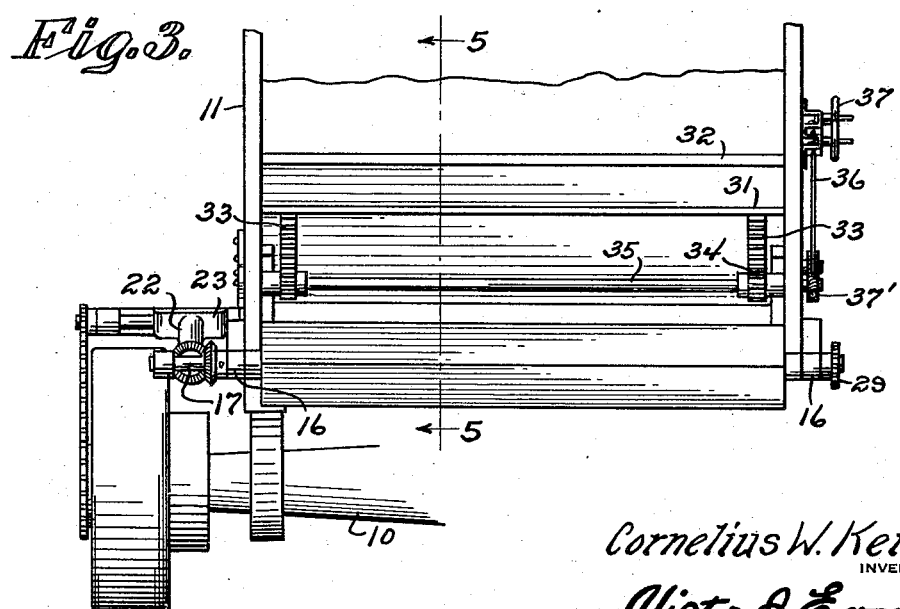

Patented Apr. 15, 1930

1,755,120

UNITED STATES PATENT OFFICE

CORNELIUS W. KERR, OF GEORGETOWN, KENTUCKY

STONE DISTRIBUTOR

Application filed April 16, 1928. Serial No. 270,545.

This invention relates to distributing apparatus primarily adapted for use upon and in conjunction with vehicle bodies to distribute the contents of the body while a vehicle is in motion.

An object of the invention comprehends end gates for the body adapted to regulate the discharge from the body upon the distributor.

Another object of the invention comprehends an endless conveyor located adjacent the end gates and which is adapted to receive the discharge contents of the body and to distribute the same in layers rather than heaps.

More specifically stated, the conveyor is adapted to be driven by the wheels of the vehicle and may be regulated to distribute the contents of the body in layers of different depths.

With the above and other objects in view, the invention further consists of the following novel features and details of construction, to be hereinafter more fully described, illustrated in the accompanying drawings and pointed out in the appended claim.

In the drawings:—

Figure 1 is a side elevation of the invention as applied upon a vehicle body disposed in a discharging position.

Figure 2 is a top plan view of the invention as applied.

Figure 3 is an end elevation of the driving connection between the vehicle wheels and endless conveyor.

Figure 4 is a side elevation of the invention taken upon the opposite side of the body with relation to the particular disposition of the body in Figure 1 of the drawings.

Figure 5 is a sectional view taken on line 5—5 of Figure 3.

Referring to the drawings in detail, wherein like characters of reference denote corresponding parts, the reference character 10 indicates a vehicle chassis having a dump type body 11 adapted for pivotal connection therewith as at 12. A lifting apparatus 13, carried by the chassis 10 and adapted for connection with the body 11, is adapted to dispose the same in the position shown.

As disclosed, the outermost end of the dump body 11 is cut-off at an angle, as indicated at 14, the purpose of which will be presently apparent. Brace members 15, carried upon the outer sides of the body 11, are adapted to be disposed with the beveled portions 14.

Bearing members 16, carried upon the underfaces of the brace members 15, are adapted to journal spaced parallel axle members 17 therein. Pulley members 18 of hexagon shape being carried upon said axle members.

An endless conveyor, composed of sections 19, is provided with beveled side portions 20, which are adapted to conform to the faces of the pulley wheels 18 when the same travel thereover, substantially as illustrated in Figure 5 of the drawings. Bindings 21, carried upon the outer surfaces of the sections 19, are adapted to serve as a means of support and to establish connection between said sections. The conveyor, as illustrated, is disposed within the discharge end of the truck body.

A drive shaft 22, having yokes 23 upon the ends thereof, are provided with sleeves 24, adapted to accommodate one of the axles 17 and a stub shaft 25 carried upon the chassis. The stub shaft carries a gear 26 over which is passed a chain or other connections, such as indicated at 27, driven by a sprocket wheel 28, carried upon one of the driving wheels of the vehicle. As illustrated in Figure 2 of the drawings, bevel gear connections are established at the ends of the drive shaft with the particular axle 17 and stub shaft 25. The opposite ends of the axles 17 are provided with sprocket wheels 29 over which a chain 30 is passed to establish a driving connection between the driven axle and the idler. End gates 31 and 32 respectively, slidably mounted within the body 11 adjacent the endless conveyor, are each provided with rack bars 33 adapted for meshing engagement with spur gears 34 carried upon shafts 35 journaled within the side portions of said body. The axles and spur gears are rotated by operating shafts 36 from hand wheels 37 upon the outer side of the body 11 and which are provided with worms 37 upon their opposite ends adapted for engagement and driving connection with worm gears 38 which rotate the shafts 35 and spur gears 34 to impart reciprocating movement to the respective end gates 31 and 32. The end gate 32 is adapted to be regulated with relation to the floor of the body 11, whereas the end gate 11 is adjustable to regulate the clearance between the lowermost end thereof and the upper surfaces of the sections 19 of the endless conveyor.

The invention is primarily designed for use in road construction where macadam or other stone is used for the road bed. Heretofore the stone was dumped in heaps and afterwards spread out over the proposed foundation. With the present invention, the vehicle is moved into position over the road bed and the body 11 is shifted to occupy the position shown. The end gate 32 is then open to permit the stone to pass from the body 11 upon the endless conveyor. The end gate 31 spreads the stone evenly upon the conveyor and the latter distributes the stone in layers rather than heaps when the vehicle is in motion, thereby obviating the usual necessity of spreading and leveling off the stone from heaps.

The invention is susceptible of various changes in its form, proportions and minor details of construction, and the right is herein reserved to make such changes as properly fall within the scope of the appended claim.

Having thus described the invention, what is claimed is:—

A stone distributor adapted for use in conjunction with dump truck bodies comprising a conveyor having one side thereof disposed at an inclination within the discharge end of the body in its normal position, a driving connection between the drive wheels of the vehicle and said conveyor, end gates for the conveyor and body slidably mounted between the side portions of the body, operating shafts having connection with the end gates, and adjusting means carried upon the outer side of the body adapted for connection with said shafts to raise and lower the end gates whereby the discharge of the truck may be regulated and leveled upon the conveyor and distributed in a layer upon the roadway while the vehicle is in motion.

In testimony whereof I affix my signature.

CORNELIUS W. KERR.